United States Patent
Fisher

[15] 3,697,098
[45] Oct. 10, 1972

[54] MODULAR HOME TRANSPORT VEHICLE

[72] Inventor: Robert L. Fisher, Elkhart, Ind.
[73] Assignee: Elkhart Welding and Boiler Works, Inc., Elkhart, Ind.
[22] Filed: Oct. 7, 1970
[21] Appl. No.: 78,901

[52] U.S. Cl. ............... 280/415 R, 52/143, 280/81 R, 280/150.5, 280/404
[51] Int. Cl. ........................... B60p 3/40, E04h 1/12
[58] Field of Search ......... 280/404, 81 A, 81 B, 34 A, 280/34 R, 418, 415, 106 T; 52/143; 214/505, 515

[56] References Cited

UNITED STATES PATENTS

| | | | |
|---|---|---|---|
| 3,231,121 | 1/1966 | Powell | 214/515 |
| 1,989,940 | 2/1935 | McGaughan | 280/80 |
| 3,330,574 | 7/1967 | Kulyk | 280/34 A |
| 2,848,252 | 8/1958 | Martin | 280/415 B |
| 3,505,767 | 4/1970 | Fyle | 52/143 |
| 2,743,936 | 5/1956 | Bigge | 280/34 A |
| 3,139,288 | 6/1964 | Peterson | 280/34 A |

FOREIGN PATENTS OR APPLICATIONS

| 1,562,963 | 3/1969 | France | 52/143 |
|---|---|---|---|

*Primary Examiner*—Leo Friaglia
*Attorney*—Marmaduke A. Hobbs, Maurice W. Green and Kemon, Palmer and Estabrook

[57] ABSTRACT

A modular home transport vehicle having a front section with a tongue and coupling means for connection with a tractive vehicle, and a second section having an undercarriage for transporting the module, the two sections are secured to the under side of a module in spaced relation to one another, and in transporting the vehicle on a return trip, the two sections are coupled together to form a unitary trailer vehicle.

9 Claims, 5 Drawing Figures

INVENTOR.
ROBERT L. FISHER
BY Hobbs & Green
ATTORNEYS

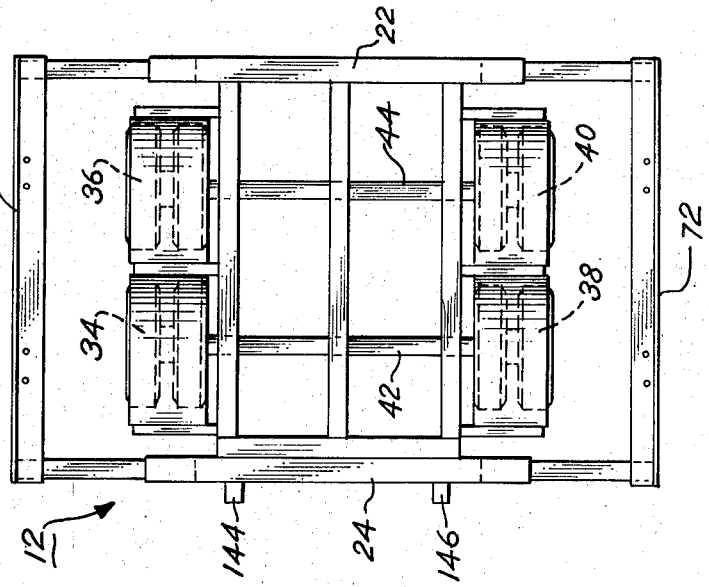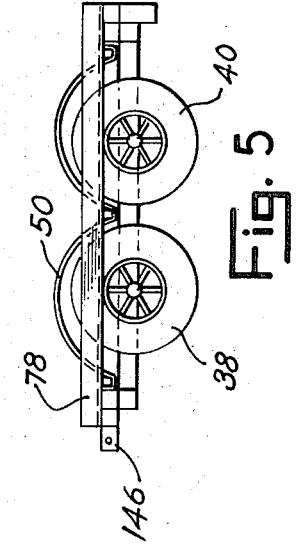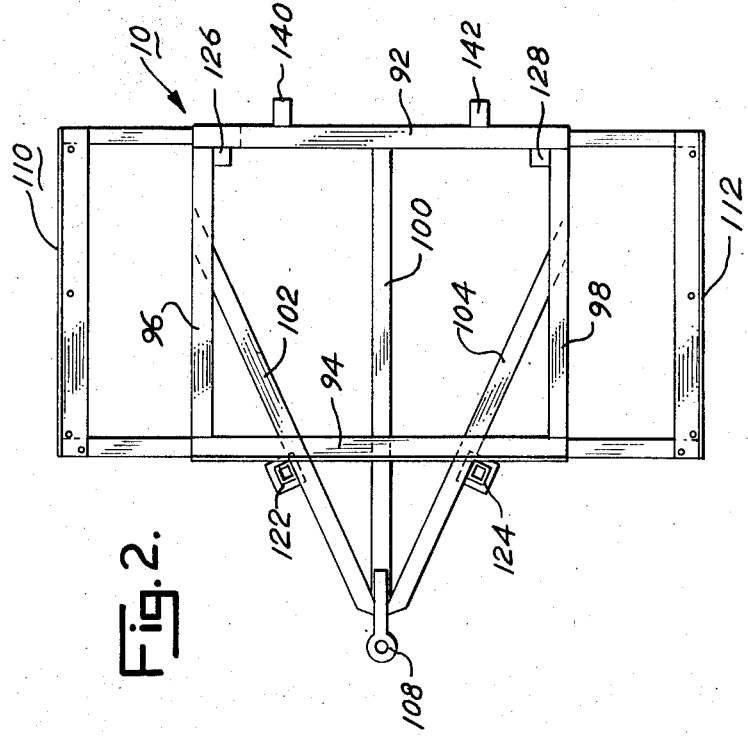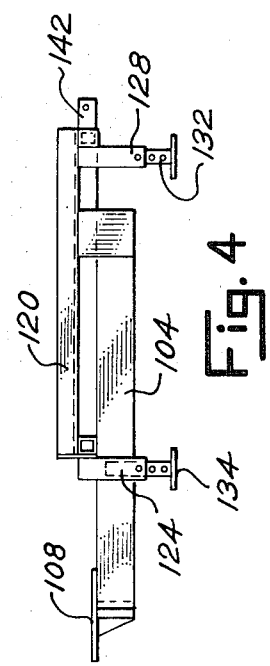

MODULAR HOME TRANSPORT VEHICLE

In the usual practice in the modular home industry, the modules are constructed at a factory and then transported on the highways, often for long distances, using a tractor truck which, after delivery of the module, returns without a load to the factory for another module. The type of modular home which has become popular and widely used, consists of two elongated modules constructed separately in the manufacturing plant and delivered as individual units by a transport vehicle to the home site or dealer, where they are then joined together to form the complete home. These half-home modules are often forty to sixty feet in length and twelve feet in width, and are usually constructed on a steel frame having two longitudinal beams which extend substantially the full length of the module and which are sufficiently rigid to support the superstructure without any appreciable flexure, with only two supports along their length. While the basic structure of the module is similar to the basic structure of the large and extensively used mobile homes, unlike mobile homes, they are not intended to be moved from time to time, and hence do not need a permanent undercarriage or trailer structure which could transport the modules. Difficulty has been encountered in providing a suitable undercarriage which can readily be secured to and removed from the module and thereafter transported conveniently and safely on the return trip to the manufacturing plant. It is therefore one of the principal objects of the present invention to provide a detachable undercarriage for transporting home modules, on which the module can be easily mounted and safely transported, and from which it can thereafter readily be detached, and which is so constructed and designed that it can be pulled as a compact trailer on the return trip to the plant.

Another object of the invention is to provide a modular home transport vehicle including a detachable undercarriage and tongue structure which can be easily coupled together to form, in effect, a single unit that can conveniently be handled and transported by the tractive vehicle, and which can be adapted to fit a variety of different module frame structures.

Still another object is to provide a modular home transport vehicle which is simple in construction and operation, and which can be used equally as effectively on long as on short modules, and on wide as on narrow modules, without the necessity of any significant changes being made in the transport vehicle structure.

A further object is to provide a transport vehicle of the aforesaid type having two principal sections which, in effect, form a complete vehicle with the frame structure of the home module capable of being easily handled by the towing vehicle, and which can be either temporarily or permanently used as the sole support for the module or the complete modular home.

Additional objects and advantages of the invention will become apparent from the following description and accompanying drawings, wherein:

FIG. 2 is a top plan view of the front section of the present vehicle;

FIG. 3 is a top plan view of the rear section of the vehicle;

FIG. 4 is a side elevational view of the front section of the vehicle; and

FIG. 5 is a side elevational view of the rear section of the vehicle.

Figure 1:
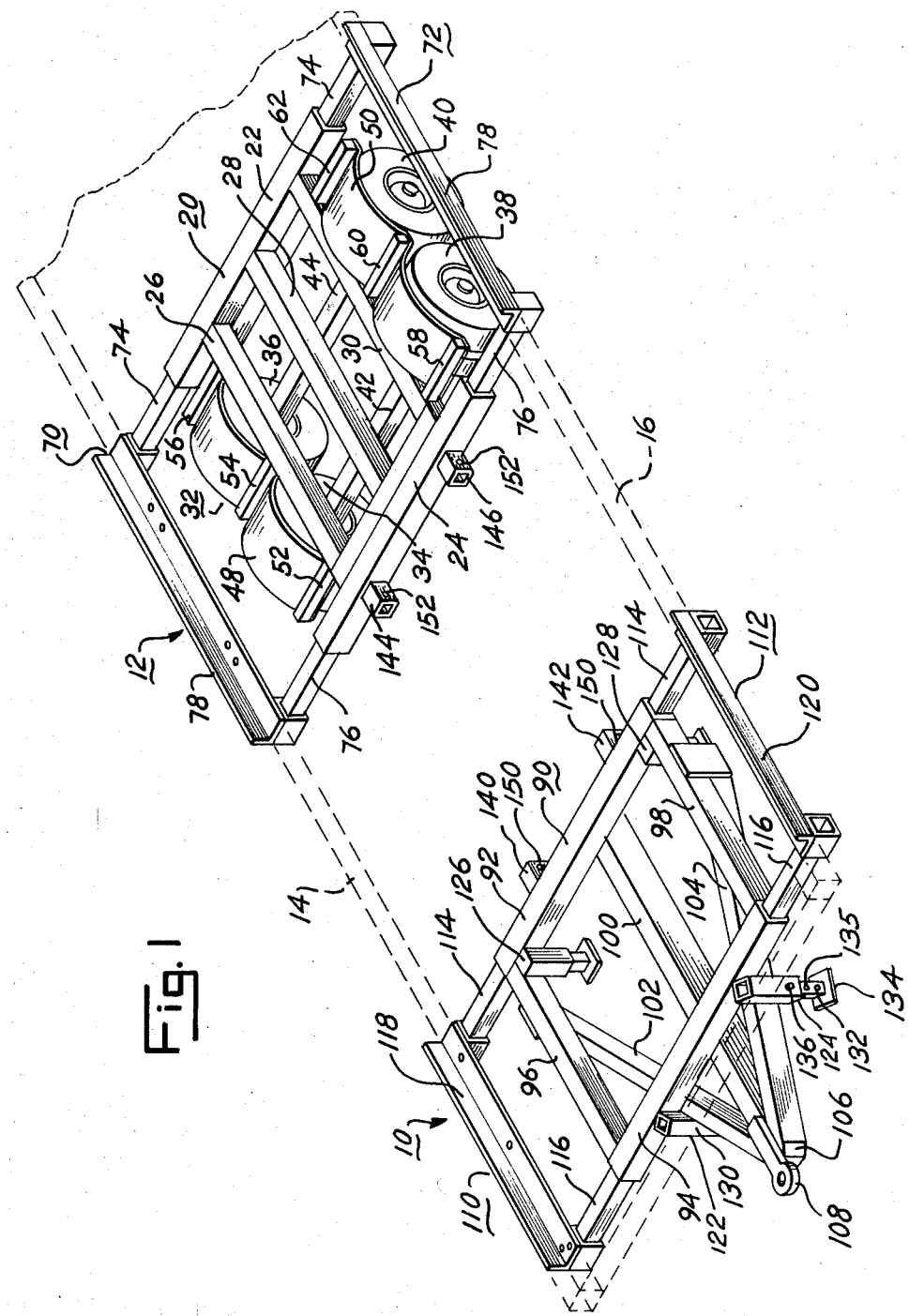
FIG. 1 is a perspective view of the present modular home transport vehicle, illustrating the manner in which the vehicle supports a modular home section, portions of the modular home being shown in broken lines.

Referring more specifically to the drawings, and to FIG. 1 in particular, numeral 10 designates generally the front section of the present modular home transport vehicle, and numeral 12 indicates generally the rear section of the vehicle. In order to illustrate the manner in which the vehicle is used, a portion of the home module is shown in broken lines indicated generally by numerals 14 and 16. The vehicle is adapted to transport various types of home modules of different lengths and widths, the relative position of the two sections 10 and 12 shown in the drawings being merely for the purpose of illustration.

Vehicle section 12 consists of a frame 20 having transverse members 22 and 24 connected by three longitudinal members 26, 28, and 30. The frame is supported on an undercarriage generally indicated by numeral 32 having dual wheels 34, 36, 38 and 40, wheels 34 and 38 being journalled on axle 42, and wheels 36 and 40 being journalled on axle 44. The two axles are connected to the frame members by leaf springs or any other suitable suspension structure. The undercarriage, while being adapted to the particular type of vehicle, is of standard or conventional construction, and hence will not be described in greater detail. Splashguards 48 and 50 are preferably provided over the wheels on each side, guard 48 being supported by three outwardly projecting members 52, 54, and 56 connected to longitudinal member 26, and guard 50 being supported by outwardly extending members 58, 60 and 62 connected to longitudinal member 30.

Mounted on transverse members 22 and 24 at opposite ends are extensions 70 and 72, each consisting of transverse bars 74 and 76 telescoping into the rectangular tubular bodies of transverse members 22 and 24. The outer ends of members 74 and 76 are connected by a rail 78. This structure permits the extensions to be adjusted laterally to accommodate modules of different widths, the two rails 78 preferably engaging and holding the under side of the main longitudinal beams of the module. Members 74 and 76 are retained in a fixed position by either screws or bolts extending through the respective members and transverse members 22 and 24, after the extensions 70 and 72 have been adjusted to the positions for accommodating a particular module.

Section 10 consists of a frame 90 having transverse frame members 92 and 94 connected by longitudinal members 96 and 98, and a tongue structure consisting of longitudinal member 100 and angular members 102 an 104, the three members being joined together at an apex 106 at the front of section 10. The three members 100, 102, and 104 are welded or otherwise rigidly secured to the underside of frame 90 and members 96 and 98 are welded to members 92 and 94. A coupling part 108 for attaching section 10 to a tractive vehicle is rigidly secured to the three members where they are joined to form apex 106. This section has extensions 110 and 112 on opposite sides of the section, each extension having longitudinally movable bars 114 and 116 telescopically mounted in the rectangular tubular members 92 and 94 and rails 118 and 112 connecting the two bars 114 and 116. The extensions are adjustable outwardly and inwardly to adapt section 10 to modules of different widths, and after an adjustment has been made, the telescopic bars 114 and 116 are secured in place by screws or bolts extending through the respective members 92 and 94 and the respective bars 114 and 116.

Section 10 is supported on front legs 122 and 124, and rear legs 126 and 128, the front legs being rigidly joined to the angularly positioned members 102 and 104 and the rear legs being rigidly connected at the point of juncture between members 92 and 96 and 92 and 98, respectively. Each of the four legs consists of a hollow tubular member 130 and a telescopic member 132 adjustable vertically in tubular member 130 and having a foot 134 on the lower end thereof. Member 132 contains a plurality of holes 135 which receive a pin 136 extending through the side wall of tubular member 130 into holes 135. Thus the legs support section 110, which in turn supports one end of the module when the tractive vehicle is disconnected from coupling part 108.

In order to permit the present modular home transport vehicle to be returned conveniently and safely to the point of origin after the module has been delivered, the two sections 10 and 12 are connected to one another to form a single trailer structure, movable on the wheels of undercarriage 32. The two sections are connected by interfitting socket members 140 and 142 on the rear side of transverse member 92 of section 10, and members 144 and 146 rigidly connected to the forward side of transverse member 24 of vehicle section 12. The two members 144 and 146 seat into members 140 and 142, and are held therein by pins extending through holes 150 in members 140 and 142 and holes 152 in members 144 and 146. When the two sections are coupled in this manner, the vehicle thus formed is essentially a unitary structure which can be easily towed, handled, and maneuvered with or without a load thereon. The four legs can be adjusted to the desired height so that the coupling and uncoupling can be done easily by merely rolling section 12 into engaging position with section 10.

In the use of the present modular home transport vehicle, the two extensions 70 and 72 of section 12 and extensions 110 and 112 of section 10 are adjusted to the width required to support a particular module, and the two sections are then bolted onto the beams of the module, with coupling part 108 extending beyond the end of the module for connection with a coupling part on the tractive vehicle. The sections 10 and 12 are connected to the under side of a module or other structure, by the bolts extending through rails 78 of section 12 and rails 118 and 120 of section 10 into the module beams or into fixtures clamped thereon. With the legs 122, 124, 126, and 128 raised, and the coupling part 108 connected to the tractive vehicle, the module is towed in the same manner as a conventional mobile home or large trailer. After the module has been delivered, the two sections 10 and 12 are detached and removed from the module, and are connected together by coupling parts 140, 142, 144, and 146 to form a single trailer unit. With the legs raised and coupling part 108 connected to the towing vehicle, the trailer, consisting of the joined parts 10 and 12, is towed by the tractive vehicle. When the combination is disconnected from the trailer, the forward legs 122 and 124 are extended downwardly to hold the forward end of the vehicle in an essentially level position. The trailer can be pulled easily, conveniently, and safely over a highway in the compact form, and if desired, can be used to haul other types of loads. Since the two sections can be disconnected, they can be positioned on a module, mobile home, or trailer in any manner required to give optimum performance of the total vehicle when it is being towed by a tractive vehicle.

While only one embodiment of the invention has been described in detail herein, various changes and modifications may be made without departing from the scope of the invention.

I claim:

1. A modular home transport vehicle comprising a first section having a frame, a tongue structure for connecting said section to a tractive vehicle, and a means for attaching the frame of said section to the lower part of a module of a home to be transported, a second section having a frame, an undercarriage supporting said frame and a means for attaching said latter frame to the lower part of a module in spaced relation to the frame of said first section, means for coupling said first and second sections together to form a unitary trailer vehicle in which the rear of said first section is supported by said second section and said second section is towed and guided by said first section, and leg means connected to said first section for holding said first section in laterally level position and at substantially the same height as said second section when said sections are in their uncoupled position.

2. A modular home transport vehicle as defined in claim 1 in which both of said sections are provided with laterally movable extensions on each side for adjusting the width of the section to modules of various widths.

3. A modular home transport vehicle as defined in claim 2 in which each of said extensions consists of a rail and extension members movable outwardly and inwardly with respect to the respective frames.

4. A modular home transport vehicle as defined in claim 3 in which the rail of each of said extensions has means for attaching the respective section to the lower part of a structural member of the module.

5. A modular home transport vehicle as defined in claim 1 in which the undercarriage of said frame includes a front and rear axle and wheels journalled on the ends of each of said axles.

6. A modular home transport vehicle as defined in claim 1 in which adjustable legs are attached to said first section.

7. A modular home transport vehicle as defined in claim 1 in which said first section has a rear leg means and a front leg means for supporting said front section on a substantially level plane.

8. A modular home transport vehicle as defined in claim 1 in which said means for coupling said first and second section together consists of interfitting parts for retaining the frames of each of said sections on a substantially common plane.

9. A modular home transport vehicle as defined in claim 8 in which said leg means connected to said first section includes an adjustable leg.

* * * * *